US011704236B2

(12) United States Patent
Muthiah et al.

(10) Patent No.: US 11,704,236 B2
(45) Date of Patent: Jul. 18, 2023

(54) METHOD AND STORAGE SYSTEM WITH A LAYERED CACHING POLICY

(71) Applicant: Western Digital Technologies, Inc., San Jose, CA (US)

(72) Inventors: Ramanathan Muthiah, Bangalore (IN); Laxmi Bhoopali, Bangalore (IN); Vered Kelner, Moshav Gan Haim (IL); Jonathan Journo, Shaarey Tikwa (IL)

(73) Assignee: Western Digital Technologies, Inc., San Jose, CA (US)

( * ) Notice: Subject to any disclaimer, the term of this patent is extended or adjusted under 35 U.S.C. 154(b) by 42 days.

(21) Appl. No.: 17/528,390

(22) Filed: Nov. 17, 2021

(65) Prior Publication Data

US 2023/0153235 A1 May 18, 2023

(51) Int. Cl.
*G06F 12/02* (2006.01)
*G06F 12/0882* (2016.01)
*G06F 12/0804* (2016.01)

(52) U.S. Cl.
CPC ...... *G06F 12/0246* (2013.01); *G06F 12/0292* (2013.01); *G06F 12/0804* (2013.01); *G06F 12/0882* (2013.01); *G06F 2212/7201* (2013.01)

(58) Field of Classification Search
CPC ............ G06F 12/0246; G06F 12/0292; G06F 12/0804; G06F 12/0882; G06F 2212/7201
See application file for complete search history.

(56) References Cited

U.S. PATENT DOCUMENTS

| 9,563,382 | B2 | 2/2017 | Hahn et al. | |
|---|---|---|---|---|
| 10,268,584 | B2 | 4/2019 | Hahn | |
| 10,991,422 | B2 | 4/2021 | Huang et al. | |
| 2014/0082265 | A1* | 3/2014 | Cheng | G06F 12/0246 711/103 |
| 2016/0246726 | A1* | 8/2016 | Hahn | G06F 3/0613 |
| 2017/0300246 | A1* | 10/2017 | Michaeli | G06F 3/0688 |
| 2020/0089430 | A1* | 3/2020 | Kanno | G06F 3/0679 |
| 2020/0098423 | A1* | 3/2020 | Huang | G11C 11/419 |
| 2020/0110677 | A1* | 4/2020 | Kim | G06F 12/0646 |
| 2020/0142630 | A1* | 5/2020 | Lee | G06F 3/0679 |

(Continued)

OTHER PUBLICATIONS

"DRAM-Less SSD are more cost-competitive by introducing HMB"; ELINFOR Electronic and Lighting Infor Storage Website; updated by Jaquelyn on Jan. 11, 2019; 10 pages.

(Continued)

*Primary Examiner* — Tasnima Matin
(74) *Attorney, Agent, or Firm* — Crowell & Moring LLP (57) ABSTRACT

A storage system has volatile memory for use as a cache and can extend the available caching space by using a host memory buffer (HMB) in a host. However, because accesses to the HMB involve going through a host interface, there may be latencies in accessing the HMB, To reduce access latencies, the storage system views the volatile memory and the HMB as a two-level cache. In one use case, the storage system decides whether to store a logical-to-physical address table in the volatile memory or in the HMB based on a prediction of the likelihood that the table will be updated. If the likelihood for an update is above a threshold, the table is stored in the volatile memory, thereby eliminating the access latencies that would be encountered if the table needs to be updated and is stored in the HMB.

16 Claims, 9 Drawing Sheets

(56) References Cited

U.S. PATENT DOCUMENTS

2021/0096778 A1* 4/2021 Nagarajan ............. G06F 3/0656
2021/0240608 A1* 8/2021 Jean .................... G06F 12/0292
2021/0390179 A1* 12/2021 Hahn ................... G06F 21/602

OTHER PUBLICATIONS

Gupta, R.; "What is NVMe™ and why is it important? A Technical Guide"; Western Digital blog; downloaded from the Internet at What is NVMe and Why is it Important? A Technical Guide (westerndigital.com) on Nov. 16, 2021; Jun. 9, 2020; 10 pages.

Kim, J.; "Internet of Things Explosion Drives Adoption of NVMe™ Storage"; NVM Express blog; downloaded from the Internet at https://nvmexpress.org/internet-of-things-explosion-drives-adoption-of-nvme-storage/ on Nov. 16, 2021; Jun. 17, 2020; 7 pages.

Jeong, W. et al.; "Improving Flash Storage Performance by Caching Address Mapping Table in Host Memory"; In9th {USENIX} Workshop on Hot Topics in Storage and File Systems (HotStorage 17) 2017; 6 pages.

Sarkar, S; "A New Approach to AIoT Data Infrastructure Using NVMe-oF Shared Flash Storage"; EnterpriseAI; downloaded from the Internet at https://www.enterpriseai.news/2020/07/17/a-new-approach-to-aiot-data-infrastructure-using-nvme-of-shared-flash-storage/ on Nov. 16, 2021; Jul. 17, 2020; 3 pages.

* cited by examiner

METHOD AND STORAGE SYSTEM WITH A LAYERED CACHING POLICY

BACKGROUND

A storage system can have a volatile memory for use as a cache in executing non-volatile memory access commands from a host. In some environments, the host has a volatile memory (a "host memory buffer (MIR)") that the storage system can use to extend the caching space available to the storage system.

DETAILED DESCRIPTION

The following embodiments generally relate to a method and storage system with a layered caching policy. In one embodiment, a storage system is presented comprising a non-volatile memory, a volatile memory, an interface configured to communicate with a host comprising a host memory buffer, and a controller. The controller is configured to: receive, from the host, a memory access command comprising a logical address; read, from the non-volatile memory, a logical-to-physical address table that contains the logical address received from the host; predict a likelihood that an update will be made to the logical-to-physical address table; in response to the likelihood being above a threshold, store the logical-to-physical address table in the volatile memory and use the logical-to-physical address table stored in the volatile memory to translate the logical address received from the host to a physical address in the non-volatile memory; and in response to the likelihood not being above the threshold, store the logical-to-physical address table in the host memory buffer and use the logical-to-physical address table stored in the host memory buffer to translate the logical address received from the host to the physical address in the non-volatile memory.

In another embodiment, a method is provided comprising: determining whether a logical-to-physical address page read from the non-volatile memory is likely to be updated; in response to determining that the logical-to-physical address page is likely to be updated, storing the logical-to-physical address page in the volatile memory; and in response to determining that the logical-to-physical address page is not likely to be updated, storing the logical-to-physical address page in the host memory. In yet another embodiment, a storage system is provided comprising: a non-volatile memory; a volatile memory; means for determining whether a logical-to-physical address page read from the non-volatile memory is likely to be updated; means for storing the logical-to-physical address page in the volatile memory in response to determining that the logical-to-physical address page is likely to be updated; and means for storing the logical-to-physical address page in a host memory in a host in response to determining that the logical-to-physical address page is not likely to be updated. Other embodiments are provided and can be used alone or in combination.

Figures 1A, 1B:
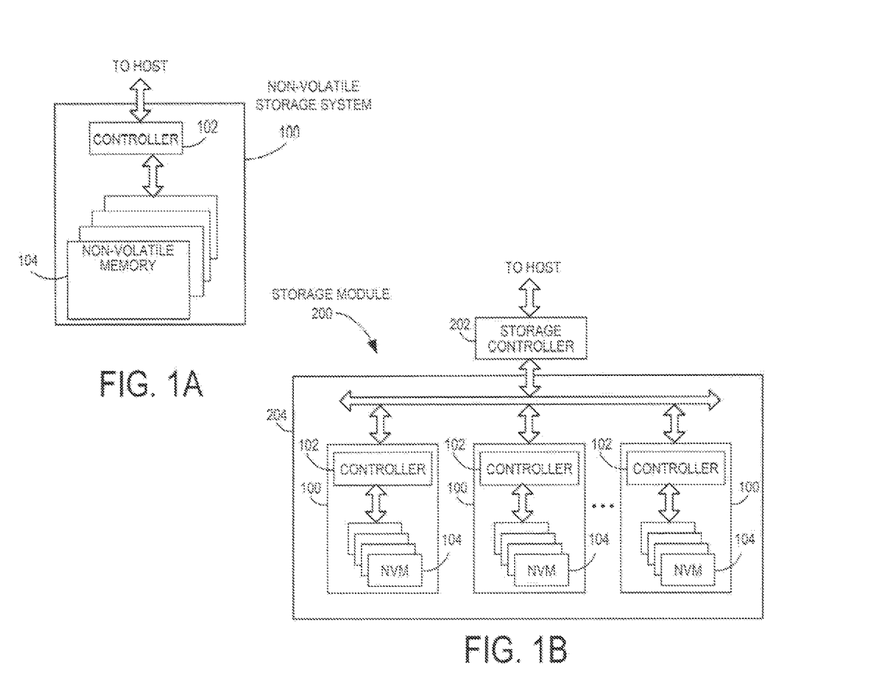
FIG. 1A is a block diagram of a non-volatile storage system of an embodiment.
FIG. 1B is a block diagram illustrating a storage module of an embodiment.
Figure 1C:
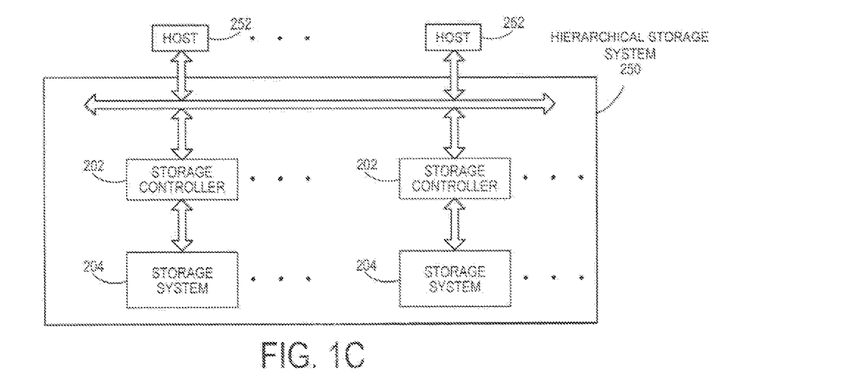
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory, channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system 250. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
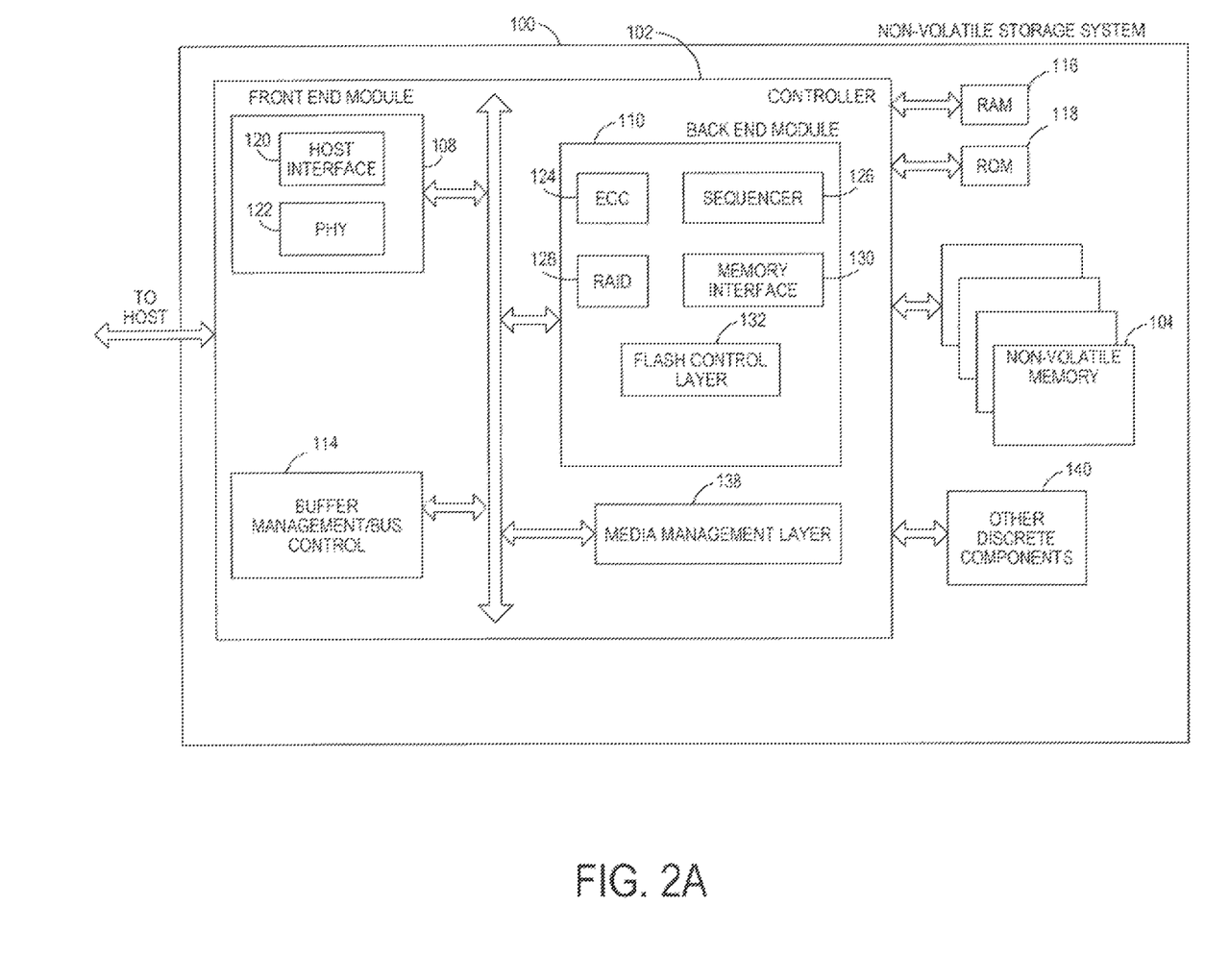
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
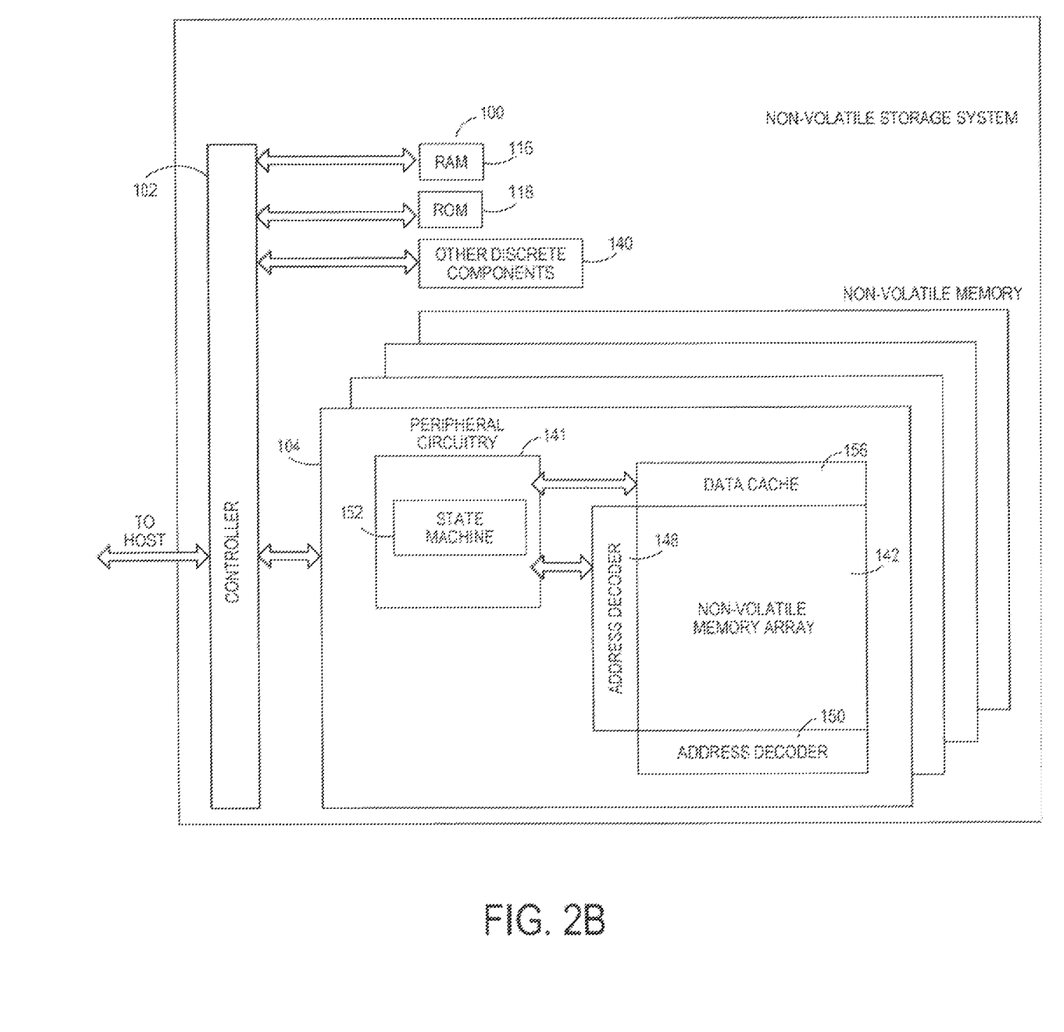
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any, suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (Fit) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FM may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
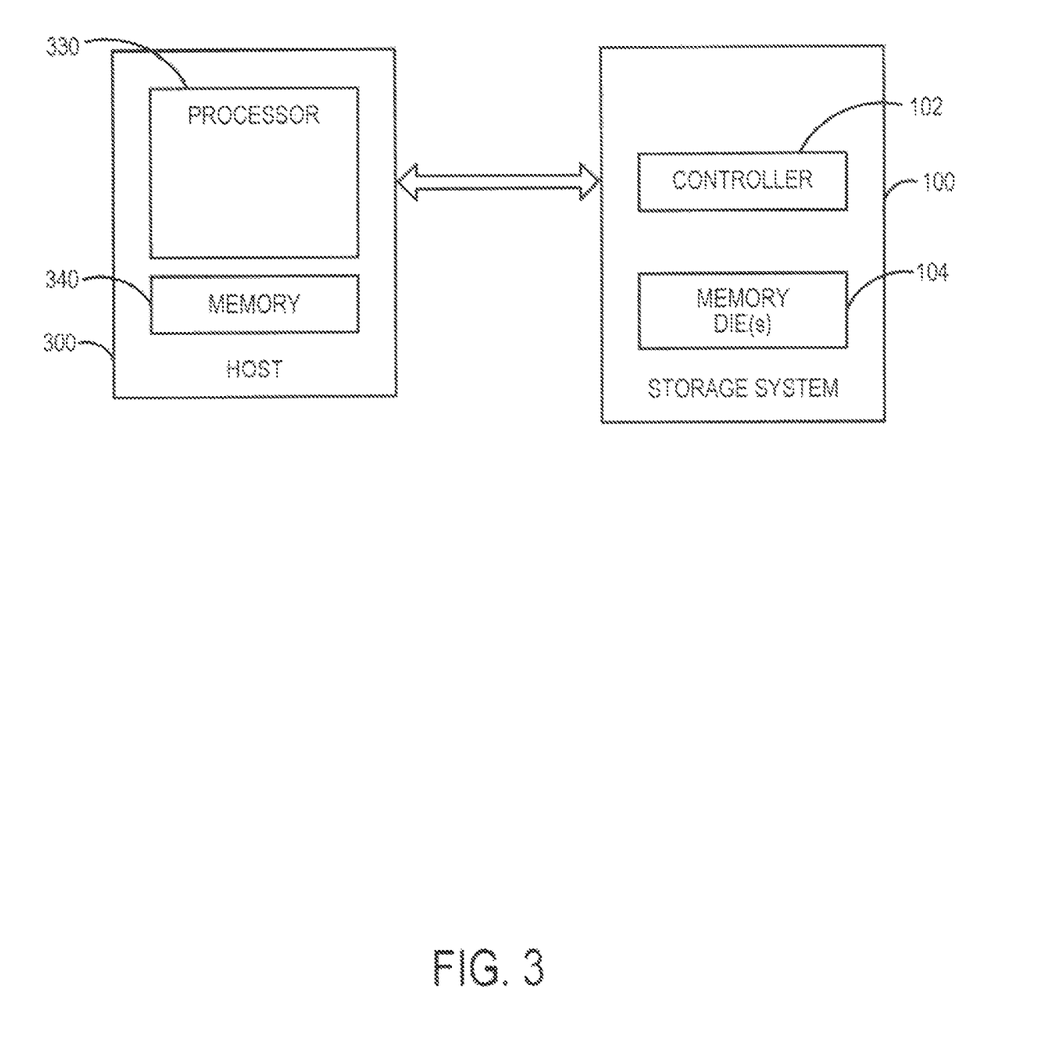
FIG. 3 is a block diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

In one embodiment, the host's memory (sometimes referred to herein as the host memory buffer (HMB)) 340 is used to extend the caching space available to the storage system 100 beyond its volatile memory (e.g., static RAM (SRAM)) 116. So, the storage system 100 can use either the host memory buffer 340 or the storage system's own volatile memory 116 to cache data. This can be useful, for example, to extend the cache available to the controller 102 and can improve performance in lower-cost storage systems that do not have as much volatile memory as higher-cost storage systems. Any suitable type of data can be stored in the host memory buffer 340, including, but not limited to, a logical-to-physical (L2P) address table or page, XOR data, user data, and device-specific data. Of course, these are merely some examples, and other types of data can be stored.

Any suitable mechanism can be used to select data for storage in the host memory buffer 340. For example, pages of data read from the non-volatile memory 104 can be initially stored in the storage system's volatile memory 116 and candidate pages for storage in the host memory buffer 340 can be selected using a least-recently-used (LRU) algorithm. So, for example, most recently-used pages can be stored in the volatile memory 116, and the least-recently-used page can be chosen for eviction from the volatile memory 116 and moved to the host memory buffer 340.

In one embodiment, when the controller 102 wants to invalidate a page that is stored both in the host memory buffer 340 and the volatile memory 116, the controller 102 makes the update to the page in the volatile memory 116 but invalidates and releases the page in the host memory buffer 340. In another embodiment, the page is retained in the host memory buffer 340 and is marked as "dirty" (outdated). The page is retained in the host memory buffer 340 because it can still be used for control reads, as the copy of the data in the host memory buffer 340 is the same as the copy of the data in the non-volatile memory 104 (because only the copy in the volatile memory 116 is updated).

While using the host memory buffer 340 can expand the available caching space available to the storage system 100, because accesses to the host memory buffer 340 involve going through the host interface 120 (e.g., PCIe interface), there may be latencies in accessing the host memory buffer 340. For example, the host interface 120 may be bandwidth-shared with input-output data (e.g., data read from or written to the memory 104 in response to a read or write command), and the state of the link can be an external parameter. As another example, the PCIe link to the host 300 can go down during certain low-power modes. As such, data stored in the host memory buffer 340 may need to be flushed prior to the low-power-mode trigger, thereby increasing latency. Additionally, data in the host memory butter 340 may be potentially lost based on the host state machine.

The following embodiments can be used to address this problem. Generally speaking, instead of viewing the volatile memory 116 and the host memory buffer 340 as the same, the storage system 100 can treat them as a two-level cache to reduce the opportunities for access latencies. For example, assume that the storage capacity of the volatile memory 116 in the storage system 100 is 256 KB and the storage capacity of the host memory buffer 340 is 768 KB. In one sense, the combination can be effectively viewed as a single storage unit with a storage capacity of 1 MB (256 KB+768 KB) (simple extended version) for typical swap in and out logic with the non-volatile memory 104. However, this view does not account for the fact that there may be latency involved in parts of the cache and/or parts of the cache may not be available during certain state machines. In contrast, by treating the combined memory as a two-level cache, the controller 102 can proactively plan for a biased approach, using the cache as one entity with two levels and recognizing that one level is closer to the controller 102 and the other level is farther away from the controller 102 (and can have latency). This recognition can allow the controller 102 to try to minimize the quality of service impact during normal as well as low-power modes.

The following paragraphs describe one particular example in which the storage system 100 classifies the host memory buffer 340 as another layer of cache rather than simply as an extended cache and incorporates backend logic in the controller 102 to efficiently use the host memory buffer 340 along with storage system's internal volatile memory 116, In this example, the data considered for storage in the host memory buffer 340 is a logical-to-physical address table/page that is used by the controller 102 to translate a logical address in a memory access command (e.g., a read or write command) from the host 300 to a physical address of a location in the non-volatile memory 104. The logical-to-physical address table can contain all the possible addressable locations in the memory 104, or it can contain only a subset of addressable locations (i.e., the logical-to-physical address table can be part of a larger logical-to-physical address table).

Figure 4:
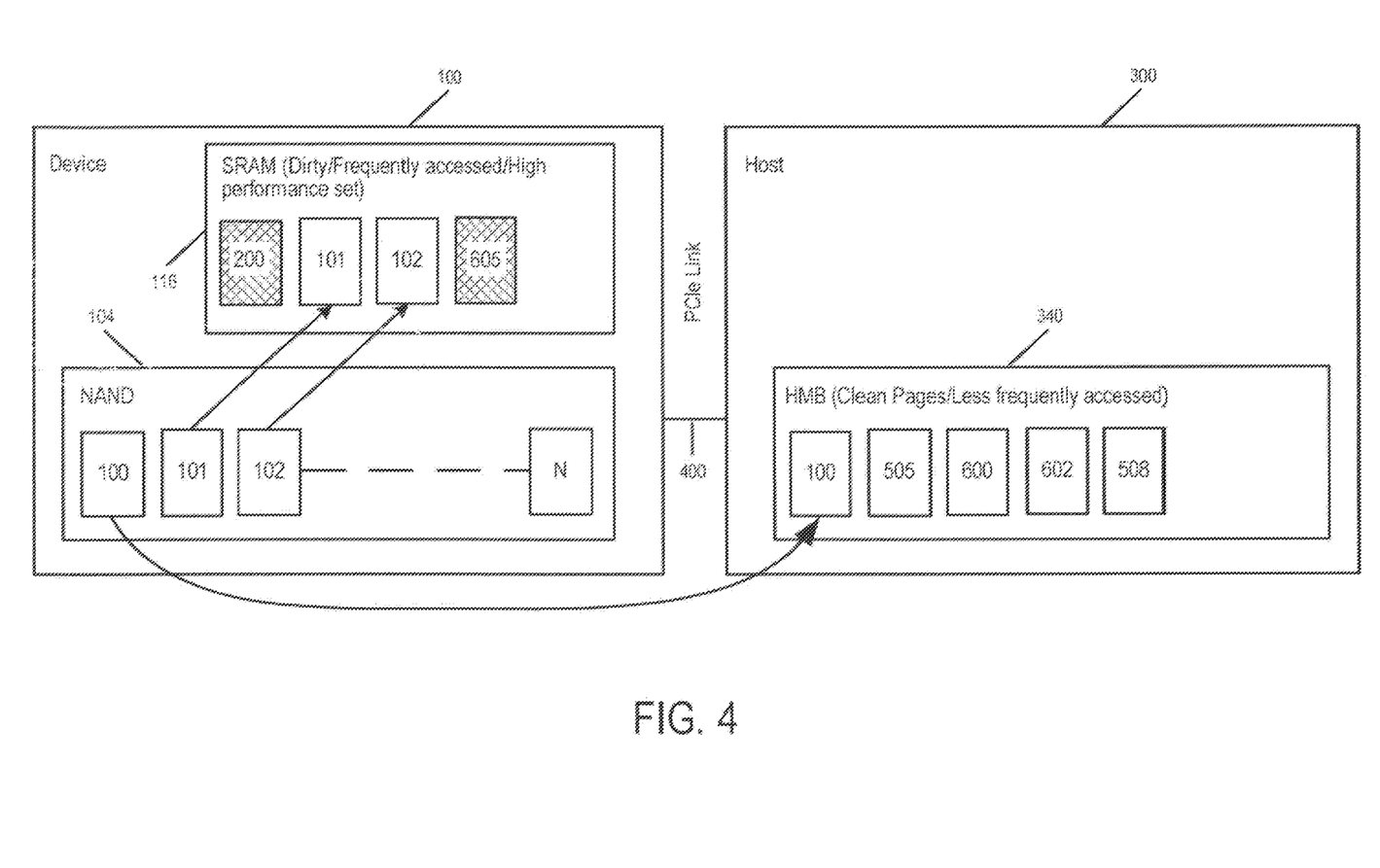
FIG. 4 is a block diagram illustrating the use of a host memory buffer of an embodiment.
Figure 5:
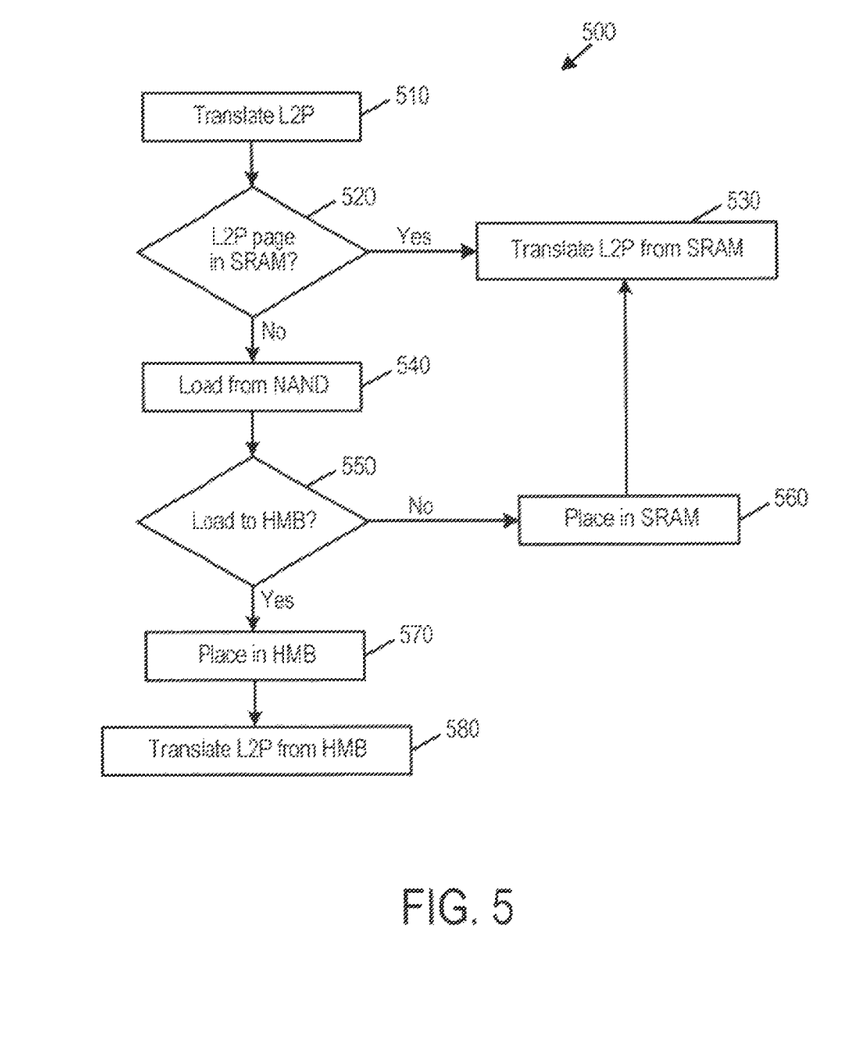
FIG. 5 is a flow chart of a method of an embodiment for implementing a layered caching policy.

This example will be described in more detail in conjunction with FIGS. 4 and 5. FIG. 4 is a block diagram of the storage system/device 100 in communication with the host 300 via a PCIe link 400, and FIG. 5 is a flow chart 500 of a method for logical-to-physical address table segregation, sometimes referred to herein as cache biasing in a read access. This method can be performed in the controller 102, which can be configured (e.g., with software and/or hardware logic) to perform the functions shown in the flow chart and described below.

As shown in FIG. 5, first, the controller 102 receives, from the host 300, a memory access command (e.g., a read or write command) comprising a logical address that needs translation to a physical address in the non-volatile memory 104 (act 510), The controller 102 then determines if the logical-to-physical address table is already present in volatile memory 116 (act 520). If the logical-to-physical address table is already present in the volatile memory 104, the controller 102 uses the logical-to-physical address table already stored in the volatile memory 116 to translate the logical address to the physical address (act 530).

However, if the logical-to-physical address table is not already stored in the volatile memory 116, the controller 102 reads the logical-to-physical address table from the non-volatile memory 104 (act 540). The logical-to-physical address table can be temporarily stored in the volatile memory 116 at this point or in another temporary memory. The controller 102 then determines whether the logical-to-physical address table should be stored in the volatile memory 116 or the non-volatile memory 104 (act 550). This decision process will be described in more detail below, but it should be noted that any suitable criteria can be used to make this decision.

If the controller 102 determines that the logical-to-physical address table should be stored in the volatile memory 116, the controller 102 moves or copies the logical-to-physical address table from its temporary storage location to the volatile memory 116 (act 560), to the extent the logical-to-physical address table is not already there. In contrast, if the controller 102 determines that the logical-to-physical address table should be stored in the host memory buffer 340, the controller 102 moves or copies the logical-to-physical address table to the host memory buffer (act 570) where it can then perform the address translation (act 580).

This process can be performed for several logical-to-physical address pages, and FIG. 4 shows the result of an example segregation process. As shown in FIG. 4, various pages of data (100, 101, 102 . . . N) are stored in the non-volatile memory 104 of the storage system 100. In this example, the segregation criteria is access frequency, and the controller 102 determines which of these pages are frequently accessed and which are less-frequently accessed. Here, pages 100, 505, 600, 602, and 508 are determined to be less frequently accessed and, accordingly, are stored in the host memory buffer 340. In contrast, pages 200, 101, 102, and 605 are determined to be frequently accessed and are stored in the storage system's volatile memory 116. Also, as will be discussed in more detail below, criteria other than access frequency can be used to determine where to move data. In FIG. 4, performance is another criteria, with high-performance pages stored in the volatile memory 116 and low-performance pages stored in the host memory buffer 340. Finally, as also shown in FIG. 4, pages 200 and 605 have been modified and are marked as such (marked as "dirty").

As noted above, the controller 102 can use any suitable technique to determine whether the logical-to-physical address table should be stored in the volatile memory 116 or the host memory buffer 340. For example, the controller 102 can predict a likelihood that an update will be made to the logical-to-physical address table. If the likelihood is above a (quantitative or qualitative) threshold, the controller 102 can store the logical-to-physical address table in the volatile memory 116. That was, when the table is updated, as predicted, the latencies involved in going through the host interface are avoided. In contrast, if the likelihood is below the threshold, the controller 102 can store the logical-to-physical address table in the host memory buffer 340. Because it is unlikely that the logical-to-physical address table will be updated, it is unlikely that an update will be needed, which would trigger access latencies. This can reduce (or nullify in some cases) the quality of service (QoS) impact due to the above-mentioned disadvantages due to the link latency and the latency due to a low-power state machine.

It should be noted that the prediction mentioned above is a prediction involving a logical-to-physical address table that is already read from the non-volatile memory 104 in response to a received command containing a logical address that requires the logical-to-physical address table for translation. Some storage systems can attempt to predict whether the host will send a memory access command in the future that will contain a certain logical address and then pre-load the logical-to-physical address table containing that logical address in either volatile memory or a host memory buffer. In one embodiment, the prediction is not for a future memory access command. Instead, the actions are taken after the memory access command has been received from the host (not predicted), which triggers the loading of the logical-to-physical address table from the non-volatile memory 104. The prediction made in this embodiment is of the likelihood of that logical-to-physical address table will be updated in the future.

The controller 102 can use any suitable logic to assess whether a logical-to-physical address table will be relatively less likely to be updated (or not updated at all) or will be relatively more likely to updated (or always updated). For example, the controller 102 can determine the likelihood based on a historic access pattern of logical addresses (cache biasing in a read access). More specifically, the controller 102 can classify a logical-to-physical address table based on host application accesses to decide whether to store the logical-to-physical address table in the volatile memory 116 or the host memory buffer 340. So, if the number of historical accesses is above a threshold, which can be set to any desired number, the controller 102 concludes that it is likely that the logical-to-physical address table will be updated (or updated frequently) and will store the table in the volatile memory 116.

In one use case, a gaming application requires random read accesses, and the logical-to-physical address table may be stored in the host memory buffer 340 once the controller 102 determines an association of the logical data to its access pattern. The controller 102 can apply a logic to determine the frequently-accessed logical region and then cache the logical-to-physical address table in the host memory buffer 340 if it is determined to be infrequently accessed. Conversely, the controller 102 can cache the logical-to-physical address table in the volatile memory 116 if it is determined to be frequently accessed to provide higher performance.

As another example, the controller 102 can segregate logical-to-physical address tables based on a performance characteristic of a portion of the non-volatile memory 104 addressed by physical addresses (e.g., part of a namespace) in the logical-to-physical address table. For example, the controller 102 can prioritize corresponding logical-to-physical address pages of a namespace/NVMe set/application data to the volatile memory 116 (i.e., with a bias against storing those pages in the host memory buffer 340) if it determines that such namespace is a high-performance region as set by the host 300. The controller 102 may further bias corresponding control pages on determining an association of logical data to multiple low-power entries, which can be application specific and lead to the storage system idle state machines). For example, logical-to-physical address pages associated with a high-performance namespace can be cached in the volatile memory 116 instead of in a low-performance namespace in the host memory buffer 340. Even though the logical-to-physical address pages are read only, if the logical-to-physical address pages are associated with region targeted for high performance, the controller 102 will keep the logical-to-physical address pages in the volatile memory 116 instead of the host memory buffer 340.

As yet another example, the controller 102 can segregate logical-to-physical address tables based on the type of data being stored at the memory locations identified by the physical addresses in the logical-to-physical address table. For example, sequential data tends to be more likely to be updated than random data. So, if the controller 102 determines that the data associated with the logical-to-physical address table is random data (e.g., by recognizing that non-sequential logical addresses are being used), the controller 102 can store the logical-to-physical address table in the host memory buffer 104. Conversely, if the controller 102 determines that the data associated with the logical-to-physical address table is sequential data, the controller 102 can store the logical-to-physical address table in the volatile memory 116. If the data is a mix of sequential and random data, the presence of sequential data (at all or above a threshold) can trigger the controller 102 to store the logical-to-physical address table in the volatile memory 116. So, if the logical address received from the host 300 is associated with sequential data, the controller 102 can conclude that the likelihood is above the threshold.

In another example, the controller 102 can determine where to store a logical-to-physical address page based on a priority level of a command that is triggering use of that page. For example, if the command being executed is from an urgent command queue, the logical-to-physical address table needed to translate the logical address in the command can be stored in the volatile memory 116. In one use case, on executing read/write commands from NVMe urgent queues, the controller 102 caches the corresponding logical-to-physical address pages into the volatile memory 116 (e.g., if a slot is available), thereby removing any link dependency for urgent control data. So, the controller 102 can determine that the likelihood is above the threshold in response to a priority command needing to access the logical-to-physical address table.

As noted above, it is possible that a logical-to-physical address page stored in the host memory buffer 340 needs to be updated. The following paragraphs discuss such cache biasing in write accesses. Random write workloads can result in many logical-to-physical address page updates across a wide range of logical block addresses. This can lead to multiple and continuous consolidation, which can be a major factor in random write performance. One way to minimize this is by storing/retaining unmodified logical-to-physical address pages in the host memory buffer 340, which has undergone updates in the volatile memory 116 due to recent writes. During the consolidation and merge process, a logical-to-physical address page is fetched from the host memory buffer 340 instead of the non-volatile memory 104, so that non-volatile memory 104 access delays are reduced or eliminated.

Figure 6:
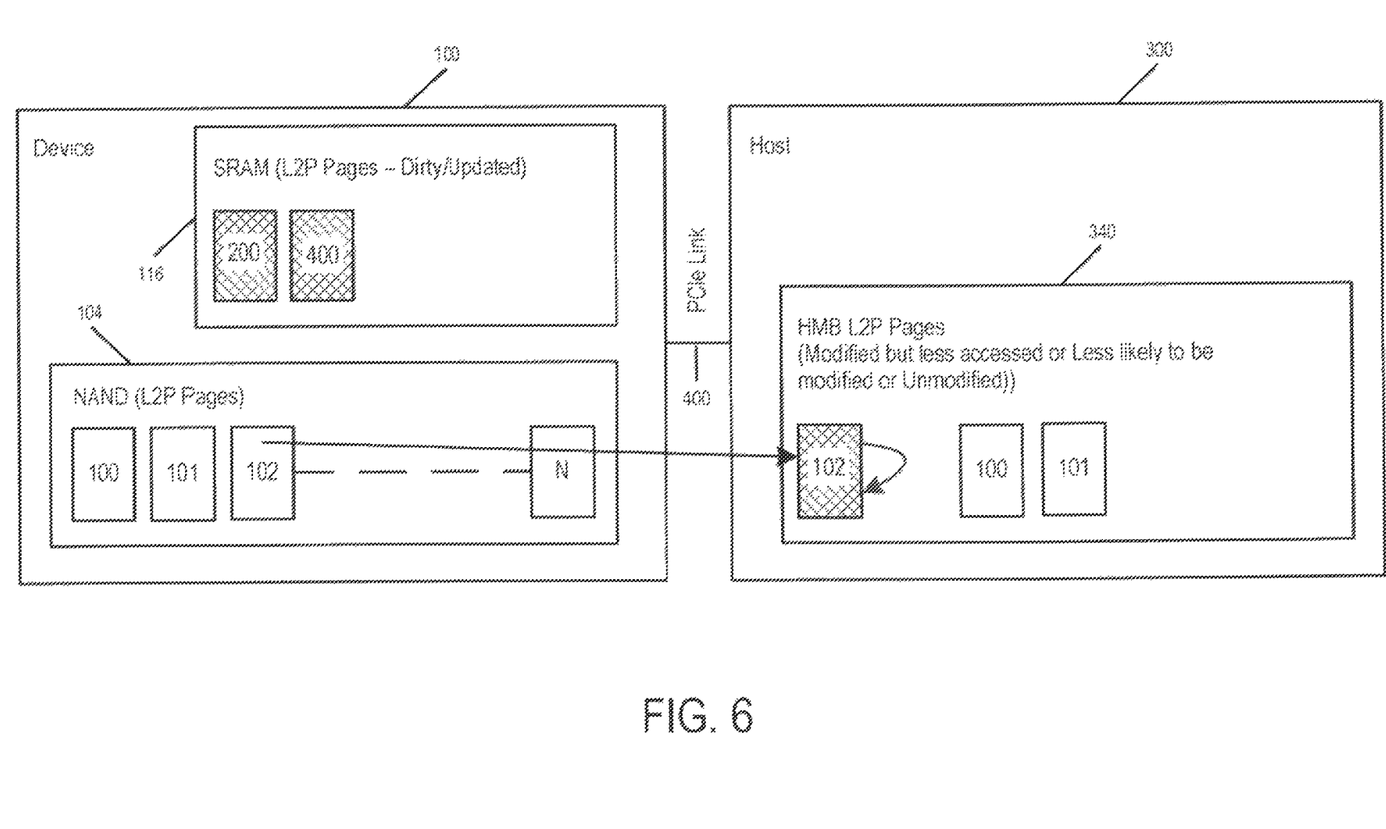
FIG. 6 is a block diagram illustrating a modification of data in a host memory buffer of an embodiment.
Figure 7:
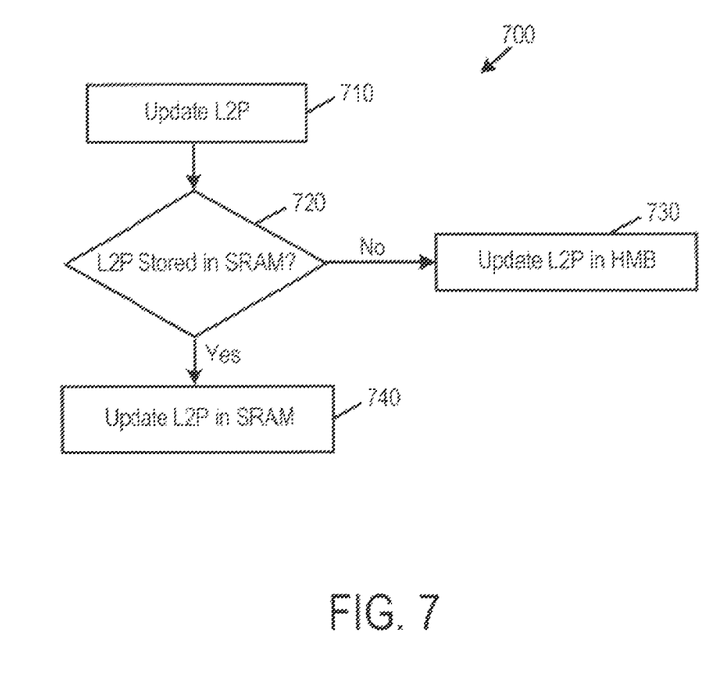
FIG. 7 is a flow chart of a method of an embodiment for modifying data in a host memory buffer.

In one embodiment, the controller 102 makes use of logical-to-physical address pages that are allowed to be modified during host writes without updating logical-to-physical address pages in the volatile memory 116, so that the logical-to-physical address pages can be used directly from the host memory buffer 340 for both consolidation and host read operations. This is shown in FIG. 6 where page 102 is modified and marked as dirty in the host memory buffer 340, Further, FIG. 7 is a flow chart 600 of a method for cache biasing in a write access. As shown in FIG. 7, when the logical-to-physical table needs to be updated (act 710), the controller 102 determines where the logical-to-physical table is stored (act 720). If the logical-to-physical table is stored in the host memory buffer 340, the controller 102 updates the logical-to-physical table there (act 730). However, if the logical-to-physical table is stored in the volatile memory 116, the controller 102 updates the logical-to-physical table there (act 740).

In response to a low-power mode or a power-off notification, the controller 102 can move dirtied pages in the host memory buffer 340 to the volatile memory 116 or consolidate the logical-to-physical address pages since the updated control data is not present in the storage system 100. The amount of dirtiness of pages in the host memory buffer 340 can be expected to be less by using the above approach in which data patterns are used to select candidate pages for storage in the host memory buffer 340.

In one embodiment, the write update for sequential data can be maintained in the volatile memory 116, and logical-to-physical address pages related to random data can be maintained in the host memory buffer 340 since those pages are not frequently updated. On the other hand, in the case of logical data associated with applications involving random and Sequential data (e.g., file allocation table (FAT) updates or image/video updates), the logical-to-physical address pages of these regions may be stored in the volatile memory 16 owing to a large number of logical-to-physical address pages updates. In this method, the typical swap in and swap out may be done dependent or independent of the two cache layers (the volatile memory 116 and the host memory buffer 340).

Figure 8:
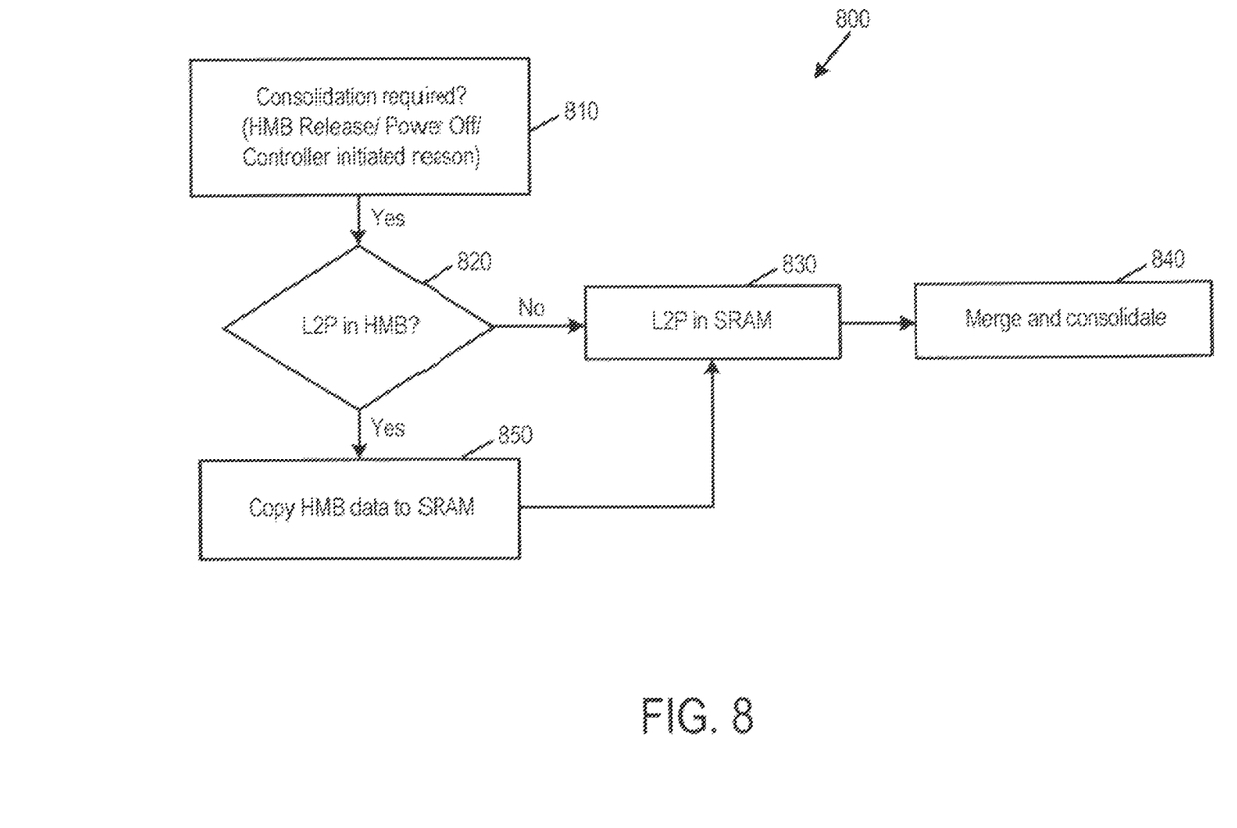
FIG. 8 is a flow chart of a method of an embodiment for consolidating data read from a host memory buffer.

FIG. 8 is a flow chart 800 of an example consolidation process. As shown in FIG. 8, the controller 102 first determines if consolation is required (act 810). Consolidation can be required, for example, if the host memory buffer 340 is being released, if there is a power-off condition, or if the controller 102 has a reason for initiating it. If consolidation is required, the controller 102 then determines if the logical-to-physical address table is in the host memory buffer 340 (act 820). If the logical-to-physical address table is not in the host memory buffer 340, the logical-to-physical address table is in the volatile memory 116 (act 830), and the merging and consolidation process takes place from there (act 840). However, if the logical-to-physical address table is in the host memory buffer 340, the controller 102 copies the logical-to-physical address table to the volatile memory 116 (act 830), and the merging and consolidation process takes place from there (act 840).

The controller 102 can consider the host memory buffer 340 to be always available. If the host 300 wants to reclaim the host memory buffer 340 for its use, the host 300 can notify the storage system 100 to perform cleanup activities. If data is present in the host memory buffer 340 but not the volatile memory 116 or in the non-volatile memory 104, the controller 102 can perform additional handling of flushing the modified data in the host memory buffer 340 during shutdown or low-power state changes. There can be an increase in these cleanup processes which can be kept minimum by optimally deciding the number of logical-to-physical address pages and also by following the proposed methods to place pages in the host memory buffer 340, which would have minimum amount of updated data in the host memory buffer 340 and, in turn, have a minimum number of logical-to-physical address pages to be flushed. There may be a risk involved in keeping updated entries in the host memory buffer 340 where lost data is recovered using replay logic that involves latency. Hence, the storage system 100 may have logic in place to determine the number of such recovery attempts and take a call on keeping the updated entries in the host memory buffer 340. This problem is not there, however, when the host memory buffer 340 is used as a read cache.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steeling element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically, contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A storage system comprising:
   a non-volatile memory;
   a volatile memory;
   an interface configured to communicate with a host comprising a host memory buffer; and
   a controller configured to:
   receive, from the host, a memory access command comprising a logical address;
   read, from the non-volatile memory, a logical-to-physical address table that contains the logical address received from the host;
   predict a likelihood that an update will be made to the logical-to-physical address table;
   in response to the likelihood being above a threshold, store the logical-to-physical address table in the volatile memory and use the logical-to-physical address table: stored in the volatile memory to translate the logical address received from the host to a physical address in the non-volatile memory; and
   in response to the likelihood not being above the threshold:
   store the logical-to-physical address table in the host memory buffer and use the logical-to-physical address table stored in the host memory buffer to translate the logical address received from the host to the physical address in the non-volatile memory;
   update the logical-to-physical address table after it has been stored in the host memory buffer;
   receive the updated logical-to-physical address table from the host memory buffer;
   store the updated logical-to-physical address table in the volatile memory; and
   perform a consolidation process using the updated logical-to-physical address table.

2. The storage system of claim 1, wherein the predicting is based on a historic access pattern of logical addresses.

3. The storage system of claim 1, wherein the predicting is based on a characteristic of a set of logical addresses comprising the logical address received from the host.

4. The storage system of claim 3, wherein the set comprises a namespace.

5. The storage system of claim 3, wherein the characteristic comprises endurance.

6. The storage system of claim 1, wherein the likelihood is above the threshold in response to a priority command needing to access the logical-to-physical address table.

7. The storage system of claim 6, wherein the priority command is from an urgent queue.

8. The storage system of claim 1, wherein the likelihood is above the threshold in response to the logical address received from the host being associated with sequential data.

9. The storage system of claim 1, wherein the interface comprises a peripheral component interconnect express (PCIe) interface.

10. The storage system of claim 1, wherein the non-volatile memory comprises a three-dimensional memory.

11. In a storage system comprising a non-volatile memory and a volatile memory, wherein the storage system is in communication with a host comprising a host memory, a method comprising:
    determining whether a likelihood that a logical-to-physical address page read from the non-volatile memory will be updated is above a threshold;
    in response to determining that the likelihood is above the threshold, storing the logical-to-physical address page in the volatile memory;
    in response to determining that the likelihood is not above the threshold, storing the logical-to-physical address page in the host memory;
    updating the logical-to-physical address page after it has been stored in the host memory,
    receiving the updated logical-to-physical address page from the host memory;
    storing the updated logical-to-physical address page in the volatile memory; and
    performing a consolidation process using the updated logical-to-physical address page.

12. The method of claim 11, wherein the determining is based on a historic access pattern of logical addresses.

13. The method of claim 11, wherein the determining is based on a performance characteristic.

14. The method of claim 11, wherein the likelihood is based on whether the logical-to-physical address page is associated, at least in part, with sequential data.

15. The method of claim 11, wherein the likelihood is based on whether a priority command needs to access the logical-to-physical address page.

16. A storage system comprising:
   a non-volatile memory;
   a volatile memory;
   means for determining whether a likelihood that a logical-to-physical address page read from the non-volatile memory will be updated is above a threshold;
   means for storing the logical-to-physical address page in the volatile memory in response to determining that the likelihood is above the threshold;
   means for storing the logical-to-physical address page in a host memory in a host in response to determining that the likelihood is not above the threshold;
   means for updating the logical-to-physical address page after it has been stored in the host memory;
   means for receiving the updated logical-to-physical address page from the host memory;
   means for storing the updated logical-to-physical address page in the volatile memory; and
   means for performing a consolidation process using the updated logical-to-physical address page.

* * * * *